US009195476B2

(12) United States Patent
Liem

(10) Patent No.: US 9,195,476 B2
(45) Date of Patent: Nov. 24, 2015

(54) SYSTEM AND METHOD FOR AGGRESSIVE SELF-MODIFICATION IN DYNAMIC FUNCTION CALL SYSTEMS

(75) Inventor: Clifford Liem, Kanata (CA)

(73) Assignee: Irdeto B.V., Hoofddorp (NL)

( * ) Notice: Subject to any disclaimer, the term of this patent is extended or adjusted under 35 U.S.C. 154(b) by 352 days.

(21) Appl. No.: 13/500,155

(22) Filed: Apr. 4, 2012

(65) Prior Publication Data
US 2012/0284792 A1    Nov. 8, 2012

Related U.S. Application Data

(63) Continuation of application No. PCT/CA2009/001430, filed on Oct. 8, 2009.

(51) Int. Cl.
*G06F 11/00* (2006.01)
*G06F 12/14* (2006.01)
*G06F 12/16* (2006.01)
*G08B 23/00* (2006.01)
*G06F 9/44* (2006.01)
*G06F 21/52* (2013.01)

(52) U.S. Cl.
CPC ............. *G06F 9/4426* (2013.01); *G06F 21/52* (2013.01)

(58) Field of Classification Search
CPC ....................................... G06F 21/14
USPC ..................................... 726/22, 26
See application file for complete search history.

(56) References Cited

U.S. PATENT DOCUMENTS

| 7,340,734 | B1 | 3/2008 | De Waal |
| 2005/0183072 | A1 | 8/2005 | Horning et al. |
| 2006/0031686 | A1 | 2/2006 | Atallah et al. |
| 2007/0234070 | A1* | 10/2007 | Horning et al. ............... 713/190 |
| 2008/0162949 | A1* | 7/2008 | Sato et al. .................... 713/194 |
| 2008/0288921 | A1 | 11/2008 | Jacob et al. |

(Continued)

FOREIGN PATENT DOCUMENTS

| CN | 101203859 A | 6/2008 |
| CN | 101416197 A | 4/2009 |
| WO | 2008144218 A1 | 11/2008 |

OTHER PUBLICATIONS

Sabu Emmanuel, "Software Code Protection Through Software Obfuscation", Mar. 2009, http://www.iitg.ernet.in/cse/ISEA/isea_PPT/Software%20Obfuscation%20Presentation.pdf.*

(Continued)

*Primary Examiner* — Andrew Nalven
*Assistant Examiner* — Khang Do
(74) *Attorney, Agent, or Firm* — Marc S. Kaufman; Amardeep S. Grewal; Reed Smith LLP

(57) ABSTRACT

Provided are a system and method for software obfuscation for transforming a program from a first form to more secure form that is resistant to static and dynamic attacks. The method utilizes a sophisticated pre-analysis step to comprehend the function-call structure, the function-call layout, and the entire function call graph of the program, in order to determine strategic points in the program for changing the program. This provides resistance to static attacks by transforming the original function-call layout to a new layout. Changing the layout may include changing the function boundaries. The method also provides resistance to static attacks by transforming the original function-call structure to a new structure to be able to self modify as the transformed program executes in memory. Changing the function-call structure may include modifying when and how functions are called, and/or choosing random paths of execution that lead to the same result.

25 Claims, 11 Drawing Sheets

(56) References Cited

U.S. PATENT DOCUMENTS

2009/0083521 A1  3/2009  Sato et al.
2009/0249492 A1  10/2009  Boesgaard Sorensen
2009/0307500 A1  12/2009  Sato et al.
2010/0251378 A1*  9/2010  Eker et al. .................. 726/26

OTHER PUBLICATIONS

European Search Report cited in corresponding European Application No. 09850175.2 dated Apr. 25, 2014.

Matias Madou et al, "Software Protection Through Dynamic Code Mutation", Jan. 1, 2006, Information Security Applications Lecture Notes in Computer Science, LNCS, Springer, Berlin, DE pp. 194-206.

Sabu Emanuel, "Software Code Protection Through Software Obfuscation", Nanyang Technological University, School of Computer Engineering, Singapore, Mar. 20, 2009.

* cited by examiner

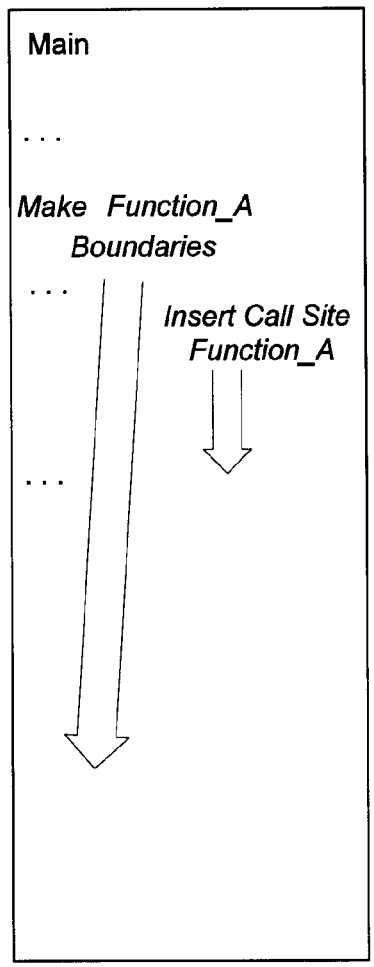 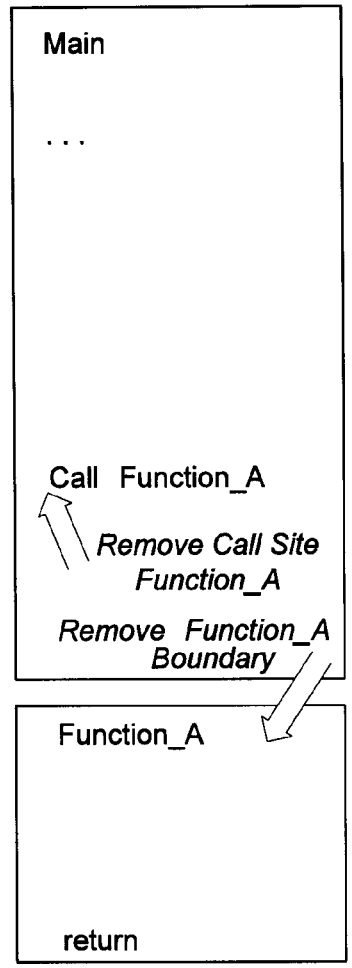 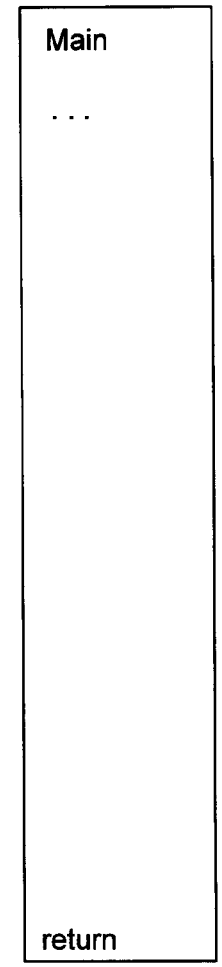
Figure 5a　　　Figure 5b　　　Figure 5c

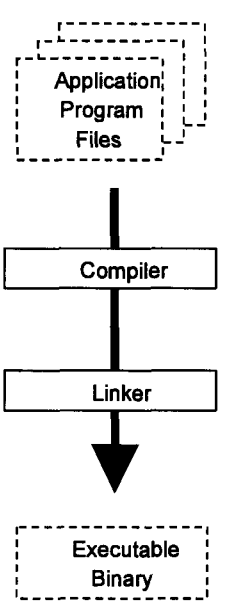 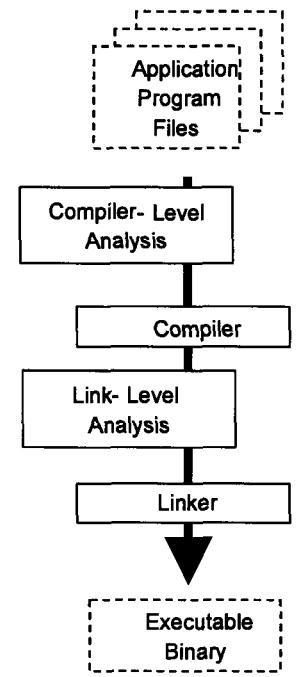
Figure 7
PRIOR ART
Figure 8

SYSTEM AND METHOD FOR AGGRESSIVE SELF-MODIFICATION IN DYNAMIC FUNCTION CALL SYSTEMS

This application claims domestic priority from PCT/CA2009/001430, filed Oct. 8, 2009, and is a continuation thereof.

FIELD OF THE INVENTION

The present invention relates generally to the field of computer security. More particularly, the present invention relates to a method and system for control-flow obfuscation of function call systems.

BACKGROUND OF THE INVENTION

Obfuscation is a transformation that prevents or delays software tampering by complicating the reverse engineering, copying or tampering (hereinafter tampering) of the software code. In many instances delaying the tampering of a software code is sufficient, especially if the software is an application that protects a financial transaction, which usually only take a few seconds to be accomplished. In the instance of copyrighted materials, obfuscation succeeds by making the tampering process long enough that the tampering process becomes prohibitively expensive when compared to the cost of a genuine copy of the software.

Software tampering includes two major kinds of attacks: Static attacks and dynamic attacks. Static attacks involve analyzing the software statically without running it, for instance using a partial evaluator. Dynamic attacks involve monitoring and lifting the code as it executes in memory in order to capture the lifted portions and re-construct the code.

In dynamic attacks, function calls, call sites, and entry and exit points are strategic targets for attackers for analyzing the control-flow of a program and retrieve its call graph.

Existing control-flow obfuscation methods are primarily applied to local control-flow including branches and jumps. This is limited to the function scope. A greater threat of intrusion is an attacker's ability to discover the call-structure such that the code can be lifted or re-implemented. Traditional calling conventions are well understood, making function call boundaries an easy point of attack.

Existing self-modifying code techniques are primarily applied to straight-line instruction blocks which perform data operations. While this may help conceal operations, it does little to hide the macro control level of the application.

With the broader use of higher level abstract languages such as C++, applications typically have more functions and deeper call-trees than their lower level language equivalents. This means that the function boundaries of applications are now at a greater risk.

For instance, PCT Application Publication No. 2008/074483 A1, Eker et al. which is incorporated herein by reference in its entirety, describes obfuscating a computer program, but fails to address the code lifting attacks, and the dynamic and step attacks, for example, using a debugger.

Eker et al. disclose a method which modifies the function call system by changing the way the address is calculated. The modified function call is computed by an algebraic expression at run-time. The result is a call-by-pointer function call with the function's address determined at run-time.

The method does not have the ability to protect a call-graph from a code lifting attack. For example, the function definition body is never modified. It can be easily statically lifted and used in another program as an exploit. Furthermore, in a dynamic attack where a debugger or monitoring program is used, the function call sequence can be followed in a step-by-step manner to find the called function of interest for code lifting and/or tampering.

Additionally, Eker et al describe that static call-sites are replaced by call-by-pointer. Nevertheless, they are still call-sites. Any call-site can be identified by its unique instruction characteristic as a useful breakpoint for an attacker. If the attacker were to break on all call-sites, then run the program, they can retrieve call-graph information through a dynamic means.

A publication entitled "Application Security through Program Obfuscation" by Matias Madou, published in 2007, which is incorporated herein by reference in its entirety, describes in chapter five thereof, a method of Trace Obfuscation which combines several techniques which occur at the instruction level by changing data operations. These techniques include: inserting diverse code, code factoring, and inserting obfuscating predicates.

Inserting diverse code is used for overwriting an instruction with one of multiple equivalent instructions based on a path taken toward the basic block in which the instruction resides.

Code factoring is a technique to merge two conditional blocks of code differing by only one instruction. In the conditional paths leading to the merged block of code, the single instruction is overwritten to provide the correct behavior just before it is executed.

The third technique includes constructing obfuscating predicates and inserting these into the code in an effort to create diversity. The predicate has a condition which will sometimes evaluate to false and sometimes to true. The successors of the predicate have equivalent, but diverse code.

Madou combines all of the three techniques described above for performing trace obfuscation of the program. However, the diversity techniques proposed by Madou are restricted to modification of data instructions. The insertion of obfuscation predicates involves only the insertion of branches whose behavior is pre-determined.

Furthermore, with the system of Madou, the sequence, order, time, and manner in which functions are called and executed remain the same. Therefore, dynamic attacks may still be successful on software protected by the method of Madou.

Moreover, the method of Madou does not protect the program against static attacks. Isolated functions can still be lifted in their entirety, and continue to behave in their original way after being lifted.

It is, therefore, desirable to provide a method and system for control flow obfuscation against static and dynamic attacks that performs a comprehensive transformation of the call graph of a program.

SUMMARY OF THE INVENTION

It is an object of the present invention to provide a protection method that involves a comprehensive transformation of the program to protect the program against static and dynamic attacks.

According to an embodiment of the invention the method comprises a sophisticated pre-analysis step to comprehend the three program characteristics of function-call structure, the entire function call graph, and the function-call layout of the original program in order to transform the program. In an embodiment, the transformation of the program may comprise an orchestration of dynamic insertion, replacement, and modification of function-related instructions at build time, whereby a static analysis (static attack) of the transformed program does not indicate the appropriate function-call layout, and thus does not indicate the behavior of the program as it executes in memory. The dynamic changes planned at build time are executed at run time, whereby, a dynamic attack monitoring the execution of the transformed program, cannot succeed in determining the appropriate function call graph or function call layout of the transformed program as it runs in memory.

In an aspect, the present invention provides a method of transforming a software program from an original form to a more secure form by changing the control flow structure of the program to protect the program against static and dynamic attacks. The method comprises analyzing original function-call structure and function-call layout of the program; transforming the original function-call layout to a new layout; transforming the original function-call structure to a new structure that is able to perform dynamic self modifications; producing a transformed program having a transformed control flow structure, but which is semantically equivalent to the original program; and transforming the original function-call graph to a new function-call graph upon execution of the program.

In this context the term "semantically equivalent" should be interpreted as "producing the same results or outputs".

In an embodiment, the dynamic self modifications change the time and the manner in which functions are called. The steps of analyzing and transforming the original program and producing the transformed program may be performed at build time, and the step transforming the original call graph to a new graph is performed at run-time. Changing the original layout and structure or the program may involve changing function boundaries to disguise the function-call layout. In an embodiment, changing function boundaries may include breaking function boundaries and joining at least two functions in one. In another embodiment, changing function boundaries includes inserting new function boundaries to divide a function into at least two functions.

The method may further comprise performing damages to the program, including at least one corruptive damage followed by at least one fix-up damage for further disguising the function-call structure and maintaining functional equivalence to the original program.

In an embodiment, analyzing the original program includes determining strategic points in the program for modifying the program and/or performing a sophisticated pre-analysis step to comprehend the function-call structure, the function-call layout, and the entire function call graph of the program. Modification points may be placed at a physically and temporally distant point from the corresponding execution points. In an embodiment, multiple modification points are provided for a single execution point.

In another aspect, the invention provides a method of transforming a software program from an original form to a more secure form by changing the control flow structure of the program to protect the program against static and dynamic attacks. The method includes a build time phase and a run time phase. The build time phase comprising the steps of Analyzing original function-call structure and function-call layout of the program; transforming the original function-call layout of the program to a new function-call layout; and transforming the function-call structure to a new structure that is able to perform dynamic modifications; producing a transformed program having a transformed control flow structure, but which is semantically equivalent to the original program. The run time phase comprises transforming the original function-call graph of the program to a new function-call graph upon execution of the program wherein the dynamic modifications performed at run time are complementary to the changes performed at build time to produce a transformed program that is semantically equivalent to the original program.

In yet another aspect, the invention provides a computer readable memory having recorded thereon statements and instructions for transforming a software program from an original form to a more secure form by changing the control flow structure of the program to protect the program against static and dynamic attacks, said statements and instructions when executed by a processor, cause the processor to perform the steps of: analyzing original function-call structure, and function-call layout of the program; transforming the original function-call layout to a new layout; transforming the original function-call structure to a new structure that is able to perform dynamic self modifications; producing a transformed program having a transformed control flow structure, but which is semantically equivalent to the original program; and transforming the original function-call graph to a new function-call graph upon execution of the program.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 5a to 5c illustrate the run time process when implementing a dynamic call system for a program having no functions other the main entry function, in accordance with an embodiment of the invention;

FIG. 7 shows a traditional set of tools used to build an application program for execution on a traditional system;

FIG. 8 shows an example of the build tools used in the dynamic function call system in accordance with an embodiment of the present invention;

DETAILED DESCRIPTION

Figure 1:
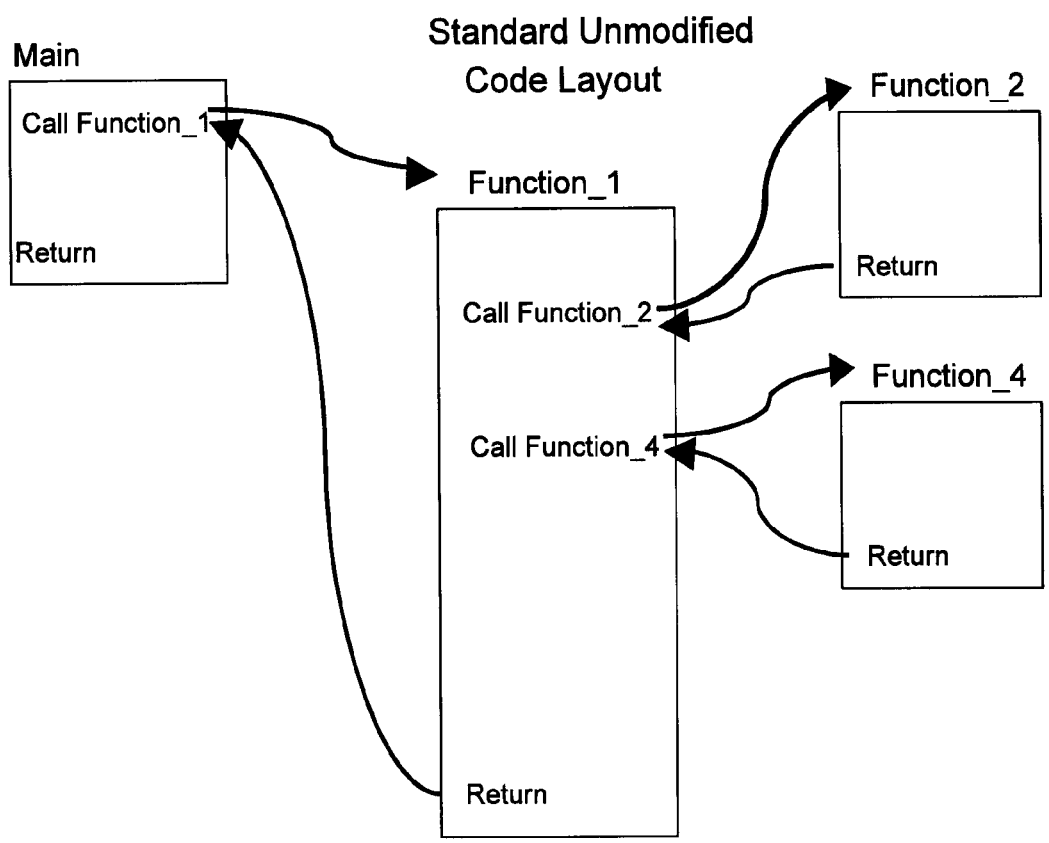
FIG. 1 illustrates a traditional function layout, call-graph, and function call sequence of a program in its original form.

Embodiments of the invention provide a system and method for software obfuscation for transforming a program from a first form to more secure form that is resistant to static and dynamic attacks. In an embodiment, the method utilizes a sophisticated pre-analysis step to comprehend the function-call structure, the function-call layout, and the entire function call graph of the program, in order to determine strategic points in the program for changing the program. The method provides resistance to static attacks by transforming the original function-call layout to a new layout. In an embodiment changing the layout may include changing the function boundaries. The method also provides resistance to static attacks by transforming the original function-call structure to a new structure to be able to self modify as the transformed program executes in memory. In an embodiment, changing the function-call structure may include modifying when and how functions are called, and/or choosing random paths of execution that lead to the same result. The transformed program is semantically equivalent to the original program but is more resistant to static and dynamic attacks.

In the following description, the terms: function-call graph, function-call structure, function-call layout, and control flow structure should be interpreted as follows:

Function-call graph is the relationship of function identifications, and the manner, order, time, and duration of functions called for execution when the program runs in memory. Function-call graphs are usually monitored by hackers for performing dynamic attacks.

Function-call structure is the structure that determines the behavior of the program during execution. It includes the program code, boundaries, input/output conventions, and calling conventions that make up the structure of functions and how and when the functions are called and executed.

Function-call layout is what the function-call structure looks like from a static point of view when the program is stored and not running i.e. number of functions, order, boundaries etc. Function call layouts are examined by attackers for performing static attacks such as code lifting and tampering.

Control flow structure is a set of operations that allow change of control through a program. On a local level, this includes branches and jumps. On a program level, the control-flow structure includes function call structure, function call layout, jumps, and branches, returns, threading and exception handling.

According to an embodiment of the invention, the transformation of a program comprises two phases:

Build time: when the program is analyzed and changed statically before execution. This phase includes analyzing the program to determine strategic points, and transforming the program by inserting decoys, creating new functions, inserting function calls, changing function boundaries etc. and changing the function-call structure.

Run-time: when the transformed program runs in memory. The new function-call structure self-modifies and changes the function-call graph. As the program executes the entire function-call graph is modified by modifying when and how functions are called.

According to an embodiment of the invention the method comprises a sophisticated pre-analysis step to comprehend the three program characteristics of function-call structure, the entire function call graph, and the function-call layout of the original program. In an embodiment, the method considers control-flow on a whole-program level, as opposed to only changing data instructions at the branch level as in the "Application Security through Program Obfuscation" by Matias Madou, discussed above. When the program is original and not obfuscated or concealed, the pre-analysis step can detect the appropriate function-call structure for the corresponding function-call graph and function boundaries. Hence, these three program characteristics match each other when the program is in its original form.

According to an embodiment of the invention, the transformation of the program comprises an orchestration of dynamic insertion, replacement, and modification of function-related instructions at build time. Hence, after the program is transformed at build time, none of the three program characteristics match the other in the transformed program. The transformed program has a new function call structure and a new function call layout. In other words, the appropriate function call structure of the program can no longer be determined by performing static or dynamic attacks. In particular, a static analysis (static attack) of the transformed program does not indicate the appropriate function-call layout, and thus does not indicate the behavior of the program as it executes in memory. Subsequently, static attacks cannot indicate the appropriate function call structure of the transformed program. On the other hand, a dynamic attack monitoring the execution of the transformed program in memory, cannot succeed in determining the appropriate function call structure nor the function call layout of the transformed program from the monitored function call graph because the transformed program performs self modifications as it runs in memory. Which modifications may include executing functions in a different order, different time, and choosing random paths of execution that lead to the same result. Accordingly, the transformed program is more secure against static and dynamic attacks, and the appropriate function call structure is better protected.

In a preferred embodiment, the transformed control flow structure includes the new function call layout, and the new function call structure. In a further embodiment, the transformed function call structure may include one or more of the following: jumps and branches, exceptions, and returns.

When the transformed program runs in memory, on a program level, an attacker monitoring the execution of the program cannot detect the appropriate function-call graph nor can he determine the appropriate function-call layout or structure of the original program. Accordingly, an attacker would be limited to monitoring the execution of the program at a very local level, that is, at the current execution point of the code. However, on a program level, an attacker cannot re-construct the program even by collecting the information about all the execution points of the program code because the control flow and function call graph of the transformed program are different than those of the original program.

As the transformed program runs in memory, function-calls, return statements, function entry points, and function layout boundaries of the original application change dynamically so as to conceal the original function call system intended by the program writer from static and/or dynamic attacks. Thus, the ease of tampering of the program either from static analysis or dynamic analysis is reduced.

The Function-call layout may be transformed to a new function call layout by breaking or changing the boundaries between functions. As a result, attackers cannot determine the entry and exit of a function using dynamic attacks at run time, nor can they determine the function call structure or function call layout of the transformed program using a static attack when the program is stored, because the function-call layout of the program is disguised. These modifications to the function body reduce the risk of the attacker lifting the complete undamaged function body.

Call-sites within the function body may also be modified, including removed or inserted. New functions may be created and called using new call sites. Call-sites are not in evidence statically. They may be inserted dynamically at run-time. Furthermore, the point at which the call-site is inserted into the program has no relation to the time at which the call is made. For example, at runtime, the program could insert or remove more than 100 different call-sites into the program before any call is made. In an embodiment, it is possible to change the time and the manner in which call-sites are inserted or removed and when a function is called. For instance it is possible to delay calls to functions, replace call-sites with other code, call functions in advance of others, mask evidence of what calls have been made or are about to be made, change their order of execution, or any combination of these techniques.

The traditional function call-return ABI (Application-Binary Interface) is transformed to a new ABI that can be modified when the application is running in memory (run-time process). In addition, function duplicates are constructed at build time (when security components and anti-tampering techniques are applied to the application to be protected) making multiple code paths possible at run-time.

At build time, a program is set-up such that the boundaries of function-call conventions may be modified dynamically. These function boundaries include call-sites, return points, entry instructions, the start and end of functions, and the like. In an embodiment of the invention, non-determinism is used to randomly choose paths of execution through the call-graph, while ensuring semantical equivalence to the original program. Non-determinism is an algorithm that randomly chooses one of a plurality of paths that lead to a valid result.

In an embodiment, the transformed program is set to have different function-call graphs whenever it is executed. Thus, an attacker monitoring the execution of the transformed program in memory would obtain different results at different execution times. However, at no time would the results obtained lead the attacker to the correct function call structure or layout of the original program.

As execution proceeds through the transformed program, instructions are modified dynamically, such that the call-sites and function boundaries are altered prior to and after execution. In an embodiment of the invention, points of the program at which instructions are modified (inserted, deleted, or changed) occur at an appropriate point before or after the execution of the modified instruction. For a modification point that occurs prior to the execution of the modified instruction, it does not matter how early or late the modification takes place, only that the modification takes place prior to the execution of the instruction.

In a further embodiment of the invention, the modification point is separated from the corresponding instructions by at least one instruction in order to prevent attackers from identifying how the instruction is being modified and also from determining the relationship between the modification and execution of the modified instruction. Therefore, it is preferable to place the modification point at a physically distant point from the corresponding execution point e.g. to have other execution points, or other code in between.

In an embodiment, separation of the modification point from the corresponding execution point may be accomplished by placing the modification point in a function that the analyzer/compiler knows will execute prior to the corresponding execution point. This analysis is called dominator analysis. The modification points do not need to have a one-to-one correspondence with execution points. These may be many-to-one or one-to-many. For instance, it is possible to have several modification points to be followed before reaching a certain execution point.

The method provides resistance to attacks of unauthorized use by concealing the function layout and call sequence from a static-based intrusion (e.g. disassembly, decompiler), concealing the function layout and call sequence from a dynamic-based intrusion (e.g. debugger, emulator), and making code lifting and tampering attacks more difficult. The result is a transformed program having a new control flow structure including a new function call layout and a new function call structure. The transformed program is semantically equivalent to the original program, but at the same time it is more resistant to tampering, code lifting, and static and dynamic attacks.

FIG. 1 is an example of a traditional function layout, call-graph, and function call sequence of a program or an application in its original, unadjusted form. Each function is called, executed, and returned in a straightforward, traditional sequence. As shown in FIG. 1, the original call sequence is as follows: the system calls Main, Main begins the execution by calling Function_1, Function_1 calls Function_2, Function_2 returns Function_1, then Function_1 calls Function_4, Function_4 returns Function_1, then Function_1 returns to Main, and Main returns to system.

Figure 2:
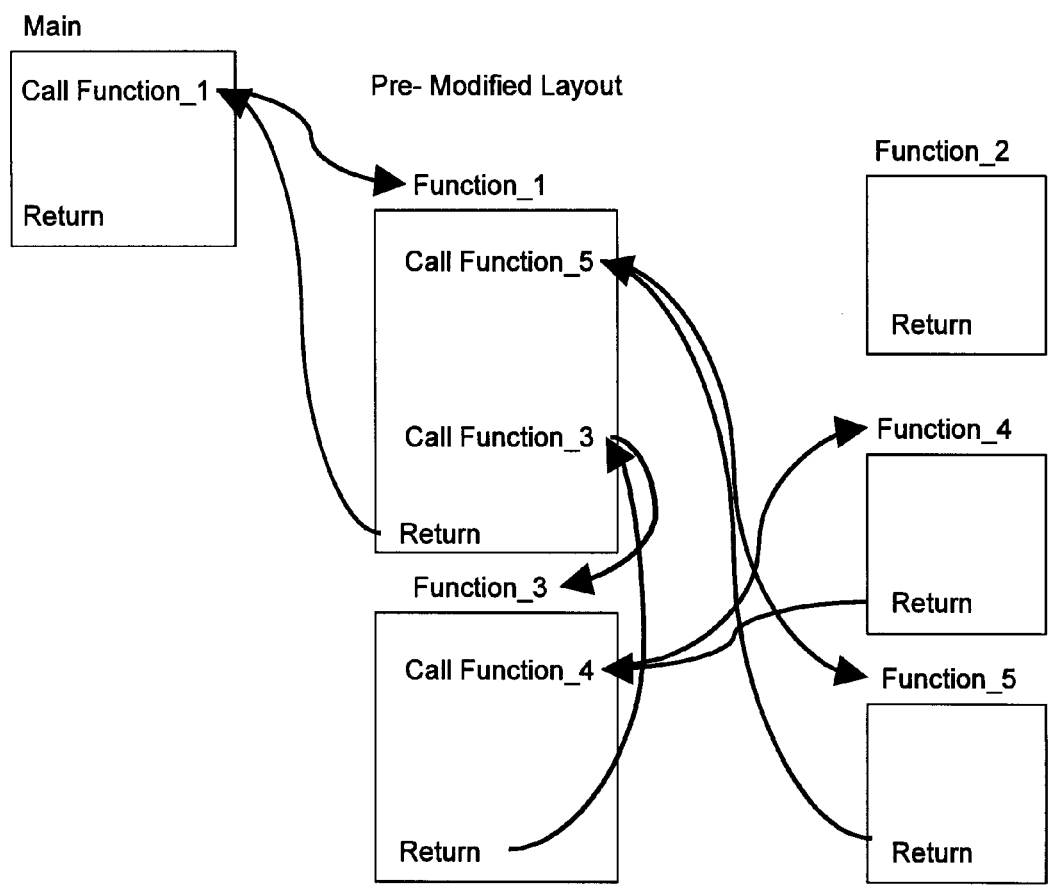
FIG. 2 illustrates a transformed version of the program shown in FIG. 1, in accordance with an embodiment of the invention.

FIG. 2 illustrates a transformed version of the program shown in FIG. 1, in accordance with an exemplary embodiment of the invention. The program shown is a transformed 'pre-loaded' program after build time. The transformed program exemplified in FIG. 2 appears to have a certain function call sequence, but in reality will execute an alternate function call sequence, since the code is modified dynamically at run-time. At build time, many code manipulation preparation steps are effected including: replacing the traditional function call conventions by a new ABI that simplifies code modification at run-time, modifying function boundaries to disguise the layout, modifying call-site points with decoy calls, decoy instructions, etc., replacing straight-line instructions with call-sites, inserting duplicate functions, and inserting additional functions.

As shown in FIG. 2, a new call function_5 is created and inserted, and the previous call Function_2 (shown in FIG. 1) has been removed. The boundary of Function_1 has also been changed by dividing original Function_1 into a modified Function_1 and new Function_3 by replacing call Function_4 by a call site to Function_3, and inserting a call site to Function_4 within Function_3. The above measures are done at build time and serve to distract an attacker from the true function call layout and calling structure.

Figure 3A:
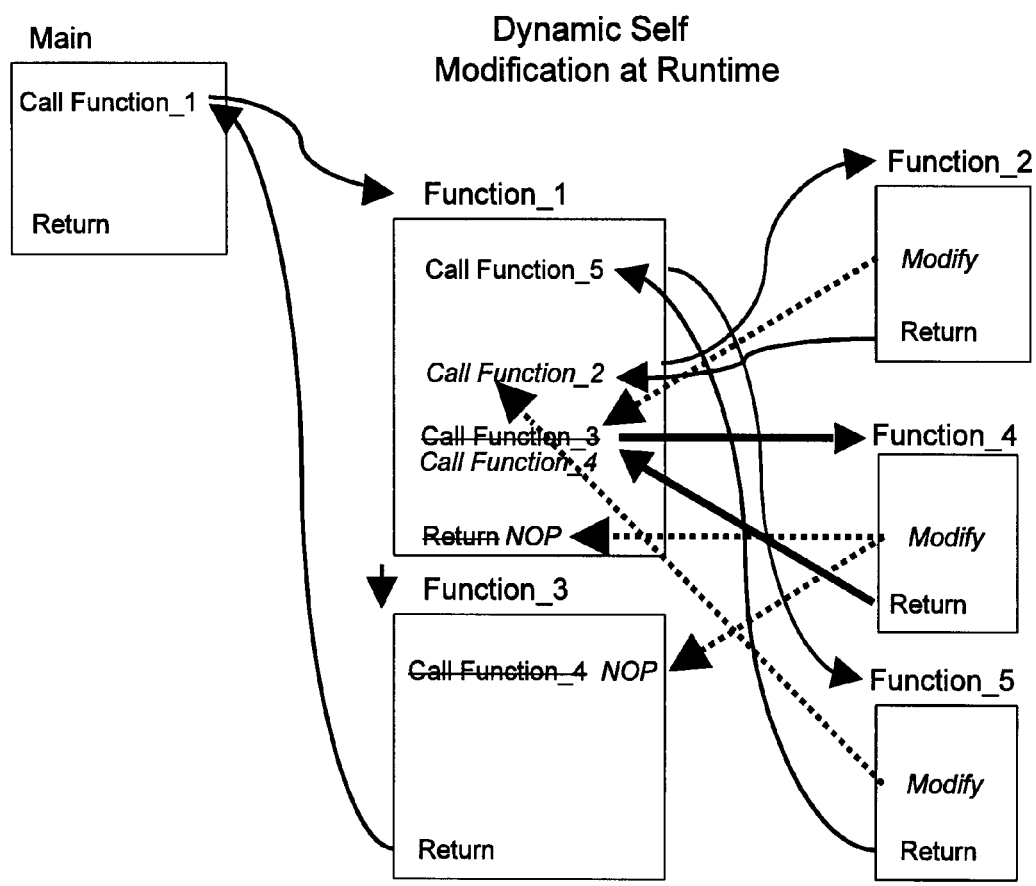
FIG. 3a illustrates the run-time process and dynamic modifications of the transformed program of FIG. 2.

FIG. 3a illustrates an example of the run-time process and dynamic modification of the transformed program of FIG. 2. As the transformed program executes, modification points alter the function-call characteristics. The modification points fix-up code portions to ensure proper execution of the program, and damage code portions to conceal information from attackers. By effecting these complementary changes between build time and run time, a transformed program may be obtained which is semantically the same as the original program, but having different function-call characteristics that distract attackers.

In the example of FIG. 3, main begins the execution, followed by Function_1, which in turn calls Function_5. Function_5 did not occur in the original program but was inserted by the compiler when analyzing the program at build time. Function_5 performs a fix-up of Function_1 by inserting a call-site to Function_2, which was removed from the original program shown in FIG. 1 at build time, as shown in FIG. 2. As the control returns to Function_1, it calls Function_2 which performs a fix-up of Function_1 by modifying the following call-site from a call to Function_3 to a call to Function_4.

When Function_4 is called, it eliminates the boundary between Function_1 and Function_3, by replacing Return by no operation (NOP), and by replacing Call Function_4 by NOP, thus, making Function_1 one large function again, as in the original program shown in FIG. 1. Control returns to Function_1 and back to main.

A similar approach would allow damages to occur dynamically in order to orchestrate a control system that is more secure against static and dynamic attacks. A damage to the program is a modification to the program that corrupts the program and makes it function incorrectly. The difference between the dynamic changes exemplified in FIGS. 2 and 3a and the damages, is that with the dynamic changes, the transformed program is fully correct statically at any time during execution, but executes in an un-expected manner. By contrast, a protected program including corruptive damages as in FIG. 3b will run incorrectly (e.g. not as the author of the program had intended) after a corruptive damage, until a fix-up modification occurs at a later time during the execution that fixes the corruptive damage.

The fix-up modification will correct the transformed program from the corresponding corruptive damage to ensure semantic equivalence to the original program. Similar to the modifications exemplified in FIGS. 2 and 3a, damages are also planned for at build-time and executed at run-time. In an embodiment of the invention, it is possible to have more than one fix-up modification for a single corruptive damage. Damages and their corresponding fix-up modifications serve for multiple purposes including but not limited to:

1. concealing the instruction that has already executed.
2. preparing the state of an instruction for a subsequent execution.
3. preparing the program for further damages and/or modifications.

Figure 3B:
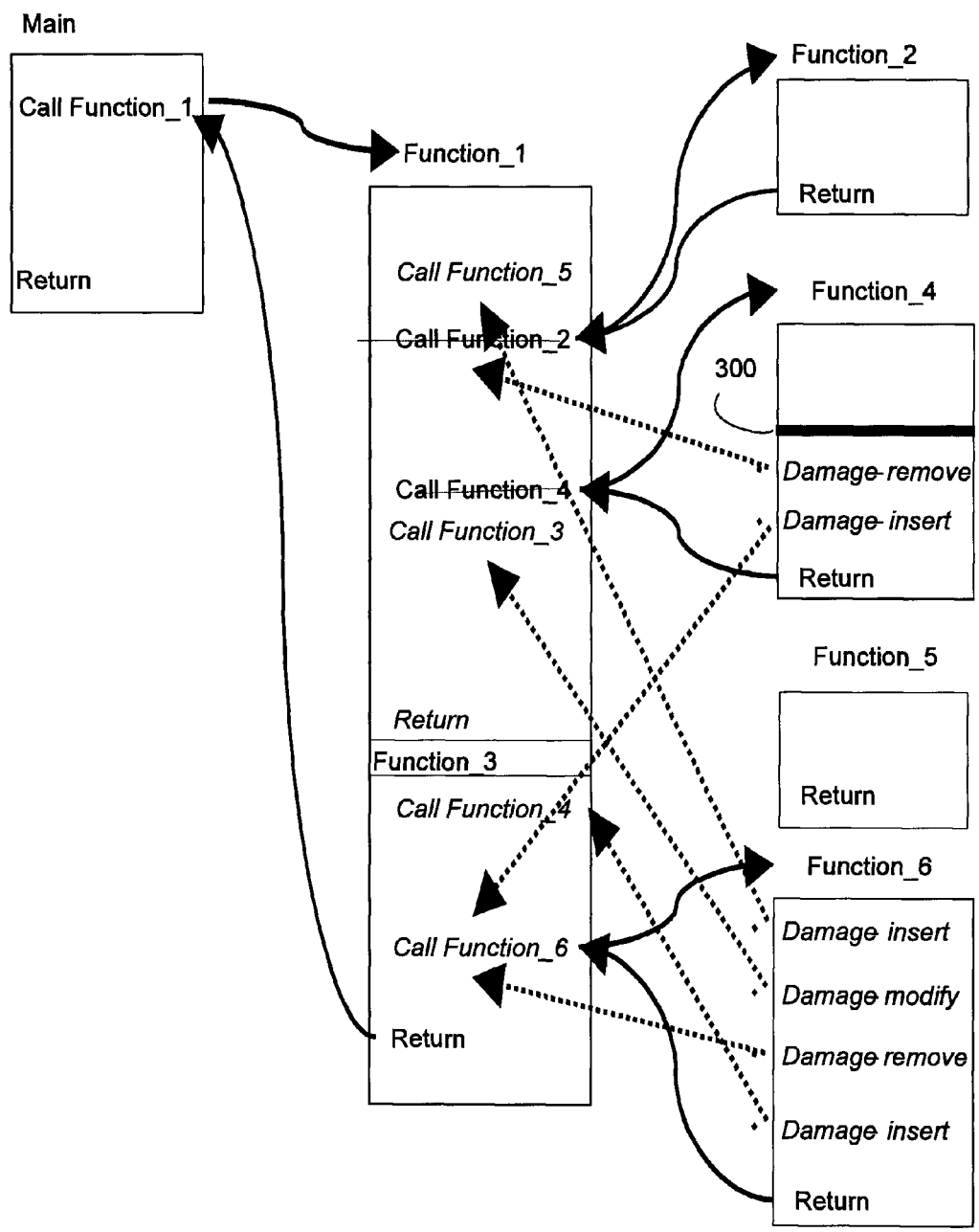
FIG. 3b illustrates an example of how damages can be made to the program for instructions that have already executed, in accordance with an embodiment of the invention.

FIG. 3b illustrates an example of how damages can be made to the program for instructions that have already executed. Assuming the program has already executed sections of the code as the analysis system has planned, damages can then occur that are used to obfuscate the real call structure of the program. With reference to FIG. 3b, consider point 300 where Function_1 has started execution, Function_2 has finished execution and Function_4 has started execution. Function_4 performs two damages:

1. An instruction (or set of instructions) in Function_4 removes calls to functions that have already occurred (e.g. Call Function_2).
2. Function_4 also inserts a call to Function_6, which did not occur in the original program.

The first damage removed evidence that Function_4 was called, and the second damage inserts a call to Function_6 which causes further damages.

When the call to Function_6 is reached, Function_6 performs four fix-up modifications:

1. Function_6 inserts a call to Function_5 which did not occur in the original program (Recall that Function_5 is used for the self-modification in the first step). This is a preparation of the state of the program for a subsequent invocation.
2. Function_6 modifies a Call to Function_4 to become a Call to Function_3.
3. Function_6 removes a call to itself, since the call has already executed.
4. Function_6 inserts the Function_3 boundary by inserting a return statement in Function_1 and a Call to Function_4, effectively creating an end to the layout of Function_1 and beginning to the layout of Function_3.

After all the damages and their corresponding fix-up modifications have occurred, the execution results in the transformed program are in harmony with the modifications pre-planned at build time as shown in FIG. 2. In other words, semantic equivalence to the original program is maintained after all the damages and the fix-up modifications occur. FIG. 3b illustrates only one example of how damages and fix-up modifications can be made to the call structure of the program, such that it is in harmony with pre-modifications performed at build time.

The code implementing the dynamic changes and/or the damages is inserted into the transformed program. The code can either take the form of a function or can be inserted as pieces of code within the program as appropriate. The code itself is protected using whitebox cryptography, data transformations, integrity verifications or similar techniques. Commonly owned U.S. Pat. No. 7,397,916 and U.S. patent application Ser. Nos. 11/020,313 and 61/175,945 which are incorporated herein by reference in their entirety, may be used for protecting the code within the program in the present invention.

Figure 4:
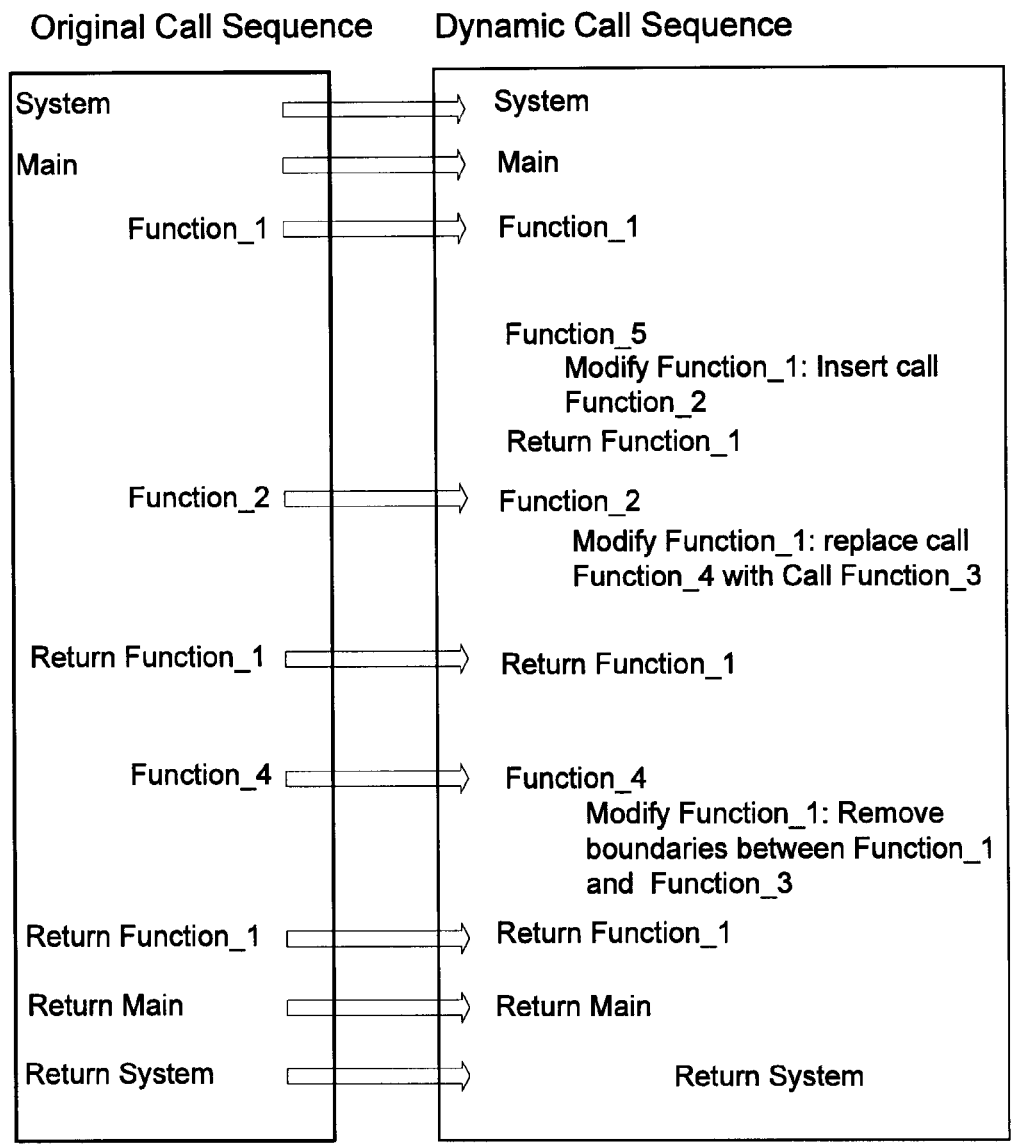
FIG. 4 is a flow diagram showing the call sequence of the original program shown in FIG. 1 versus the dynamic call sequence of the transformed program illustrated in FIGS. 2, 3a, and 3b.

FIG. 4 is a flow diagram illustrating the original call sequence of the function illustrated in FIG. 1 versus the dynamic call sequence of the transformed program illustrated in FIGS. 2 and 3a. As illustrated in FIG. 4, after Main calls function 1 the behavior of the transformed program changes dynamically as it executes in memory. For instance, in the dynamic call sequence, Function_5 has been called after Function_1, and before Function_2, while in the original call sequence Function_5 does not exist. As stated above, Function_5 was inserted at build time. Furthermore, Function_2 modifies Function_1 by replacing call function_4 with call Function_3. Function_3 is a subdivision of original Function_1 as shown in FIGS. 1 and 2. To bring Figure_1 to its original size as in Figure_1, Function_4 removes the boundaries between Function_1 and Function_3 during run-time, Thereby, fixing the changes effected at build time.

In the exemplary embodiment shown in the diagram of FIG. 4, the functions are modified, called at different times and in different manners, function boundaries are changed, and new functions are introduced and removed.

An attacker monitoring the execution of the protected program would obtain:

Deceptive functions and a deceptive function-call layout because the function boundaries are changed e.g. by changing the entry and exit of functions, some functions may be duplicated, and some functions may be created by the system which were not included in the original program;

A deceptive time of execution of each function because functions may be delayed or called in advance;

A deceptive order of execution because some functions may be executed before others when compared with the original program;

A deceptive function-call graph because functions may be broken and/or united, and random paths of execution may be chosen e.g. using non-determinism, which maintains functional equivalence to the original program but looks different when executing in memory.

FIG. 5a illustrates the run time process when implementing a dynamic call system for a program having no functions other the Main entry function as shown in FIG. 5a. The program is analyzed to determine strategic points for transforming the program to a program that dynamically changes when running. The boundary of Main is changed, as it runs, by making a boundary for Function_A within Main as indicated in FIG. 5a, as well as an entry, an exit and a call site.

After Function_A executes, the boundaries, call site, and entry and exit of Function_A are then removed, as shown in FIG. 5b.

Once the boundaries, call site and entry and exit of Function_A have been removed after execution, Main will look as if it had never been transformed, as shown in FIG. 5c. However, from an attacker point of view, tampering would not have been successful because it would have provided deceptive call-graph information.

Another extreme case would be to set-up a program so that it has an excessive number of functions statically. At run-time, the function boundaries are combined into larger functions while providing a transformed program which is semantically equivalent to the original program.

Figure 6:
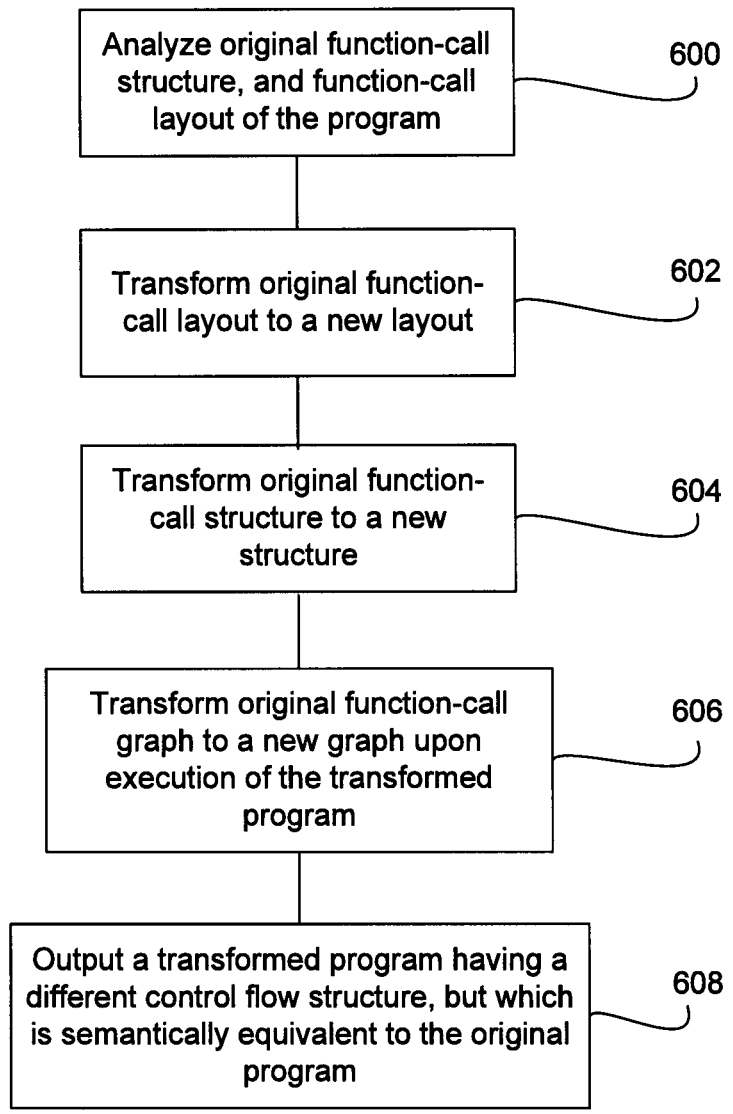
FIG. 6 is a flowchart illustrating the steps of transforming a program in accordance with an embodiment of the invention.

FIG. 6 is a flowchart illustrating the steps of transforming a program in accordance with an embodiment of the invention. As shown in FIG. 6, the original program to be protected is analyzed to comprehend the function-call structure and function call layout at step 600. At step 602, the original function-call layout is transformed to a new layout so that the transformed program looks different if analyzed statically by an attacker when stored in memory. At step 604, the function call structure is transformed to a new function call structure that is able to perform dynamic self-modifications upon execution of the transformed program. At step 606 the original function call-graph is transformed to a new graph during execution of the program in memory due to the changes that were pre-planned in steps 604 and 606.

The program is transformed so that the function boundaries such as call-sites, return points, entry instructions, the start and end of functions, and the like, may be modified dynamically to make larger or smaller functions. Call-sites within the function boundary may also be modified, including removed or inserted. Function boundaries are altered prior to and after execution to resist static and dynamic attacks. Functions duplicates, decoys, and additional instructions are inserted to make static and dynamic attacks more difficult.

At step 608 a transformed program is generated which is semantically equivalent to the original program. The protected program is different from the original program when analyzed statically, and is able to self-modify upon execution in memory to resist dynamic attacks and code lifting.

In an embodiment, the original program is analyzed to determine a level of importance for each function prior to transforming the program so as to emphasize functions which are important for security objectives or performance objectives.

For security objectives, a function can be identified as important by a user because it may contain secure assets or calculate a critical part of the security system like a root of trust key. This may be done through language extensions or through an external means like the command-line interface to indicate that the function is important from a security point of view. If this is the case, then the transformation system can emphasize efforts of obfuscation on this particular function.

For performance objectives, the compiler can identify functions which execute frequently through static profiling or real profiling means. In some embodiments where performance considerations are important, then for a function that executes frequently, transformations which are known to execute quickly would be selected for that function.

FIG. 7 shows a traditional set of tools used to build an application program for execution on a native system. The main tools used in this case are a compiler and linker, which are traditionally two separate tools, but can in some cases be combined into the same tool. In other cases, they can also be separated into more than two tools. The main function of the compiler is to perform syntactic and semantic analysis of the application program files, perform optimizations, and generate code for the linker. The linker relocates program and data segments into layouts which when combined form the binary file or set of binary files necessary for execution. Execution can be native or virtualized on a virtual machine.

FIG. 8 shows an example of the build tools used in a dynamic function call system in accordance with an embodiment of the present invention. FIG. 8 shows two new tools over the traditional tools shown in FIG. 7: a compiler-level analysis tool and a link-level analysis tool. The compiler-level analysis tool is associated with traditional compiler-level processing and can either run independently prior to or after the native compiler, or as a substitute of the traditional compiler. It can also run independently prior to, or after the native linker or as substitute of the native linker. As shown in FIG. 8, the compiler-level analysis tool runs before the native compiler. Similarly, the link-level analysis tool is associated with link-level processing. It can also run independently prior to or after the native linker or as a substitute of the native linker.

At the compiler-level, the full function-call graph of the application program can be analyzed and be represented in "may-call" and "must-call" representations. These call representations can then be analyzed globally for the allocation of insertions, removals, and modifications of instructions. The original program is strategically modified at the compiler-level for dynamic modification.

Function boundaries can be analyzed and the information can be prepared for consumption at the link-level. At the link-level, program segments are placed according to layout information passed from the compiler level, including which functions need to be adjacent to one another and in what order. This permits the function boundary dynamic modification. Furthermore, any additional static libraries and/or object code is linked into the program to perform auxiliary operations such as instruction modification. At the link-level, the components necessary for the dynamic modification system are placed in the executable binary or set of binaries.

Figure 9:
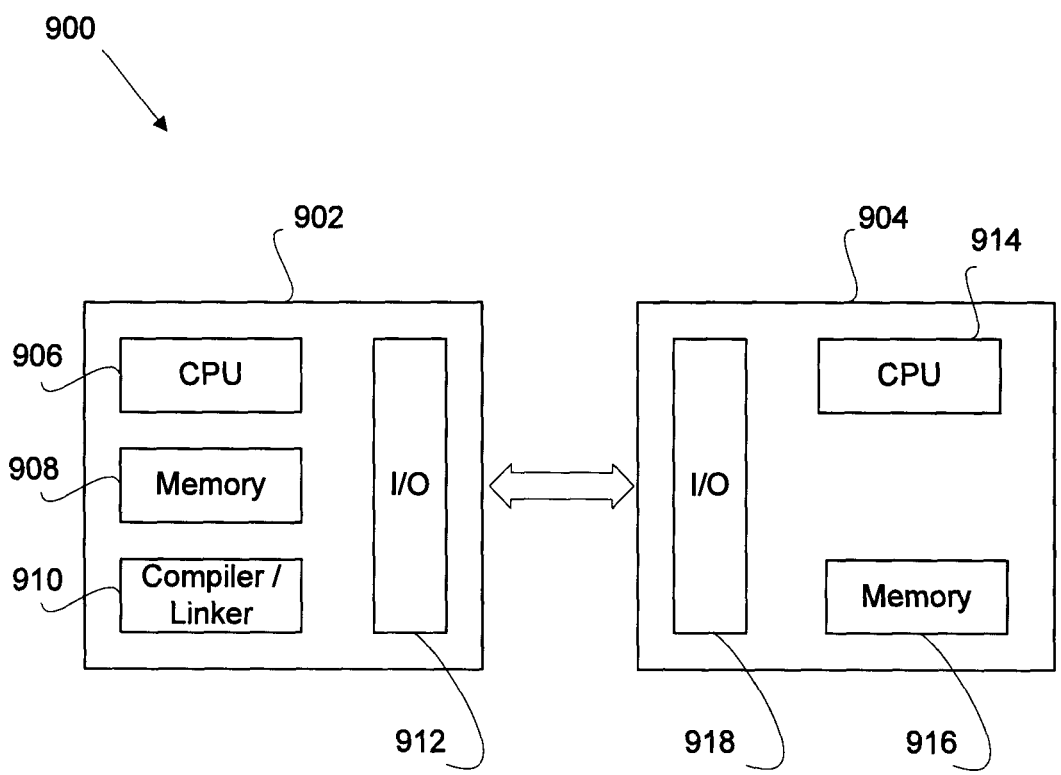
FIG. 9 illustrates an exemplary embodiment of a system for transforming an original program to a protected program that is secure against static and dynamic attacks in accordance with an embodiment of the invention.

FIG. 9 illustrates an exemplary embodiment of a system 900 for transforming a program from the original form to a more secure form against static and dynamic attacks by changing the function-call layout of the program, and transforming its function-call structure to a new structure which can self-modify dynamically when the program is running so as to provide the deceptive function-call graph to an attacker monitoring the execution of the transformed program in memory.

In the embodiment shown in FIG. 9, the system 900 includes at least two computers 902 and 904. Computer 902 includes a CPU 906, a memory 908, the set of build tools 910 shown in FIG. 8, and an input output module (I/O) 912. Computer 904 includes a CPU 914, a memory 916, and an I/O 918. Computer 902 receives the original program to be transformed and performs the build-time process to change the function-call layout and function-call structure of the program. The transformed program is then transferred to computer 904 for storage and/or execution. The transformed program may be transferred to computer 904 either by a communication link or by a computer readable memory such as a CD, DVD, USB drive or any other means.

The transformed program is semantically equivalent to the original program but is more secure against static and dynamic attacks. When the transformed program is stored on computer 904, it resists static attacks because the function-call layout does not reflect the real layout of the original program. Hence, an attacker trying to analyze the function-call layout of the transformed program would obtain the deceptive layout because the function boundaries, call sites and order of execution of the functions in the protected program are changed by the compiler/linker. When the transformed program is executed by computer 904, the function-call structure self modifies as the transformed program executes so as to change the original function-call graph by changing when and how functions are called.

In an embodiment, the code that performs the function boundary modification does not need to be in the same execution thread as the program. It could optionally be placed in a concurrent thread or in a virtual machine layer that runs between the program code and the operating system (i.e. OS). Accordingly, the modification code is independent from the program and can run intertwined with program functionality or disjoint from program functionality. Alternatively, a combination of the intertwined and disjoint approach could be used.

Figure 10A:
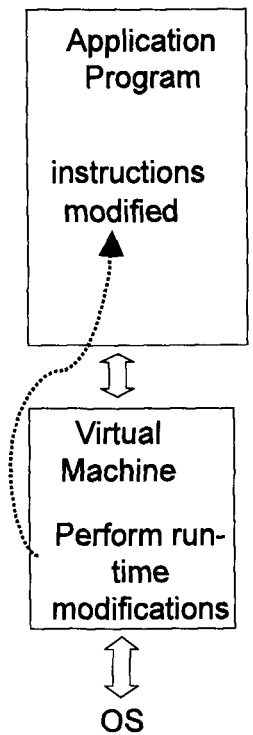
FIGS. 10a to 10c show alternative operation setups for dynamic function call systems.
Figure 10B:
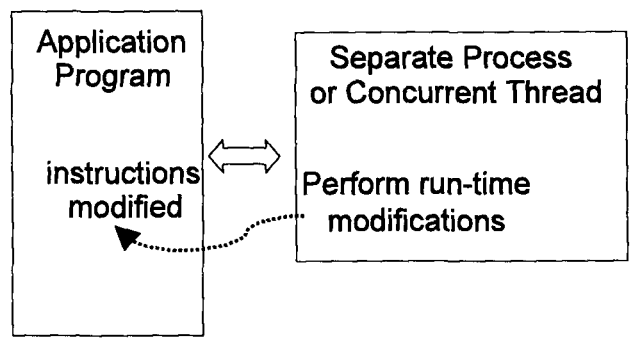
Figure 10C:
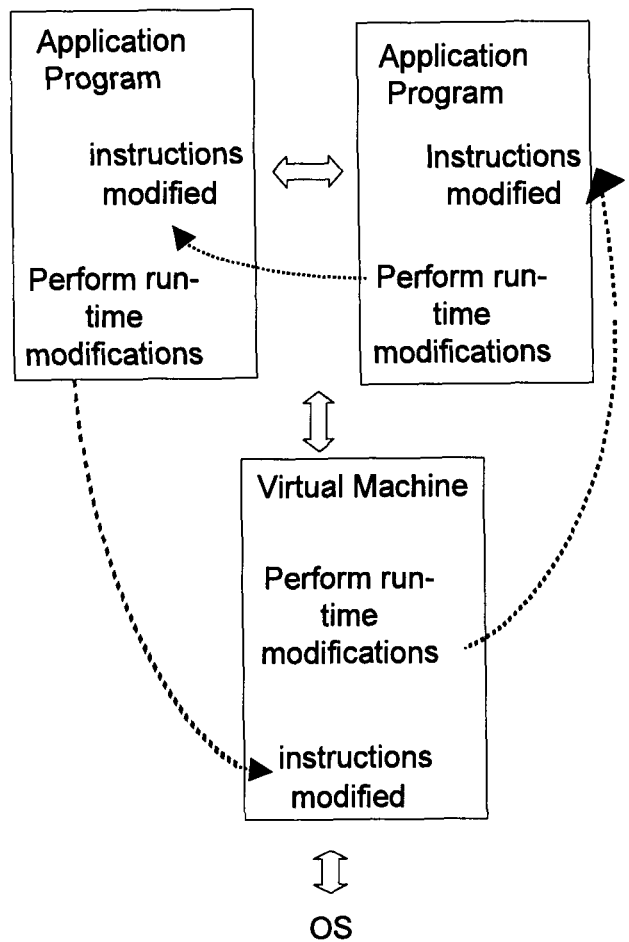

FIGS. 10*a* to 10*c* show alternative operation setups for dynamic function call systems according to exemplary embodiments of the invention.

FIG. 10*a* shows an application virtual machine which is placed between the application program, and the operating system (i.e. OS). The virtual machine manages the execution of instructions. When an instruction is ready to be executed, the virtual machine can interpret the instruction or send it directly to the OS to be executed natively. In this embodiment, the virtual machine performs instruction modifications to the application program which is running. Similar build-time analyses tools are necessary for this setup as in the case of when the instruction modifications are in the application itself.

FIGS. 10*b* shows a concurrent process or thread which runs alongside the application program. This separate thread or process runs semi-independently of the application program. In this case, the separate process or thread executes concurrently with the application program through any of a number of synchronous or asynchronous execution schemes. Instruction modifications to the application program can be made from the concurrent process or thread. Similar build-time analyses tools are necessary for this setup as in the case of when the instruction modifications are in the application itself.

FIG. 10*c* shows a combination of the setups in FIGS. 10*a* and 10*b*. Two concurrent threads or processes are running. Additionally a virtual machine runs between the application level and OS level. Each concurrent application thread or process can modify instructions in the other application thread or process. Alternatively, an application thread or process can modify instructions in the virtual machine. Similarly, the virtual machine can modify instructions in either of the application processes/threads. Furthermore, this setup does not preclude either of the application processes/threads from modifying itself as in the independent case. The virtual machine can modify itself as well.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

The invention claimed is:

1. A method executed by one or more computing devices for securing a software program the method comprising:
    transforming, by at least one of the one or more computing devices, an original software program into a transformed software program during build time, wherein transforming comprises:
        transforming an original function-call layout of the original software program to a new function-call layout during build time, wherein the new function-call layout is different than the original function call-layout and includes one or more modification instructions; and
        transforming an original function-call structure of the original software program to a new function-call structure during build time, wherein the new function-call structure includes functionality for dynamically modifying itself during execution; and
    modifying, by at least one of the one or more computing devices, the new function-call structure during execution of the transformed program based at least in part on the one or more modification instructions, wherein the transformed program is semantically equivalent to the original program and wherein the transformed software program has a control flow structure that is different than a control flow structure of the original software program.

2. The method of claim 1, wherein the functionality for dynamically modifying itself includes functionality for at least one of changing a time of a function call, inserting a function call, removing a function call, replacing a function call with other code, changing an order of function calls, and removing evidence of a previous function call.

3. The method of claim 1, wherein transforming an original software program into a transformed software program further comprises determining a level of importance for each function in the original software program.

4. The method of claim 1, wherein transforming the original function-call layout of the original software program to a new function-call layout comprises changing function boundaries.

5. The method of claim 4, wherein changing function boundaries includes breaking function boundaries and joining at least two functions in one.

6. The method of claim 4, wherein changing function boundaries includes inserting new function boundaries to divide a function into at least two functions.

7. The method of claim 1, wherein transforming the original function-call structure of the original software program to a new function-call structure comprises generating multiple possible execution paths of the transformed program by inserting function duplicates.

8. The method of claim 7, wherein random execution paths are chosen during execution of the transformed software program.

9. The method of claim 1, wherein modifying the new function-call structure during execution comprises changing the order of execution of functions in the transformed software program.

10. The method of claim 1, wherein transforming the original function-call layout of the original software program to a new function-call layout comprises creating new functions and inserting new function calls.

11. The method of claim 1, wherein transforming the original function-call layout of the original software program to a new function-call layout comprises inserting decoys.

12. The method of claim 1, wherein modifying the new function-call structure during execution comprises removing instructions and replacing them with no operation (NOP) instructions.

13. The method of claim 1, wherein modifying the new function-call structure during execution comprises performing damages to the program including at least one corruptive damage followed by at least one fix-up damage.

14. The method of claim 1, wherein the original software program has a first control flow structure and the transformed software program has a second control flow structure.

15. The method of claim 14, wherein the second control flow structure includes at least one of jumps, branches, returns, and exceptions.

16. An apparatus for securing a software program, the apparatus comprising:
one or more processors; and
one or more memories operatively coupled to at least one of the one or more processors and having instructions stored thereon that, when executed by at least one of the one or more processors, cause at least one of the one or more processors to:
transform an original software program into a transformed software program during build time, wherein transforming comprises:
transforming an original function-call layout of the original software program to a new function-call layout during build time, wherein the new function-call layout is different than the original function call-layout and includes one or more modification instructions; and
transforming an original function-call structure of the original software program to a new function-call structure during build time, wherein the new function-call structure includes functionality for dynamically modifying itself during execution; and
modify the new function-call structure during execution of the transformed program based at least in part on the one or more modification instructions, wherein the transformed program is semantically equivalent to the original program and wherein the transformed software program has a control flow structure that is different than a control flow structure of the original software program.

17. The apparatus of claim 16, wherein the functionality for dynamically modifying itself includes functionality for at least one of changing a time of a function call, inserting a function call, removing a function call, replacing a function call with other code, changing an order of function calls, and removing evidence of a previous function call.

18. The apparatus of claim 16, wherein the instructions that, when executed by at least one of the one or more processors, cause at least one of the one or more processors to transform the original function-call layout of the original software program to a new function-call layout further cause at least one of the one or more processors to:
create new functions; and
insert new function calls.

19. The apparatus of claim 16, wherein the instructions that, when executed by at least one of the one or more processors, cause at least one of the one or more processors to modify the new function-call structure during execution further cause at least one of the one or more processors to:
perform damages to the program including at least one corruptive damage followed by at least one fix-up damage.

20. The apparatus of claim 16, wherein the instructions that, when executed by at least one of the one or more processors, cause at least one of the one or more processors to modify the new function-call structure further cause at least one of the one or more processors to: remove instructions and replace them with no operation (NOP) instructions.

21. At least one non-transitory computer-readable medium storing computer-readable instructions that, when executed by one or more computing devices, cause at least one of the one or more computing devices to:
transform an original software program into a transformed software program during build time, wherein transforming comprises:
transforming an original function-call layout of the original software program to a new function-call layout during build time, wherein the new function-call layout is different than the original function call-layout and includes one or more modification instructions; and
transforming an original function-call structure of the original software program to a new function-call structure during build time, wherein the new function-call structure includes functionality for dynamically modifying itself during execution; and
modify the new function-call structure during execution of the transformed program based at least in part on the one or more modification instructions, wherein the transformed program is semantically equivalent to the original program and wherein the transformed software program has a control flow structure that is different than a control flow structure of the original software program.

22. The at least one non-transitory computer-readable medium of claim 21, wherein the functionality for dynamically modifying itself includes functionality for at least one of changing a time of a function call, inserting a function call, removing a function call, replacing a function call with other code, changing an order of function calls, and removing evidence of a previous function call.

23. The at least one non-transitory computer-readable medium of claim 21, wherein the instructions that, when executed by at least one of the one or more computing devices, cause at least one of the one or more computing devices to transform the original function-call layout of the original software program to a new function-call layout further cause at least one of the one or more computing devices to:
  create new functions; and
  insert new function calls.

24. The at least one non-transitory computer-readable medium of claim 21, wherein the instructions that, when executed by at least one of the one or more computing devices, cause at least one of the one or more computing devices to modify the new function-call structure during execution further cause at least one of the one or more computing devices to:
  perform damages to the program including at least one corruptive damage followed by at least one fix-up damage.

25. The at least one non-transitory computer-readable medium of claim 21, wherein the instructions that, when executed by at least one of the one or more computing devices, cause at least one of the one or more computing devices to modify the new function-call structure during execution further cause at least one of the one or more computing devices to:
  remove instructions and replace them with no operation (NOP) instructions.

* * * * *